Feb. 10, 1942.    G. LAUBE ET AL    2,272,566
CAMERA FREE HEAD
Filed March 29, 1939
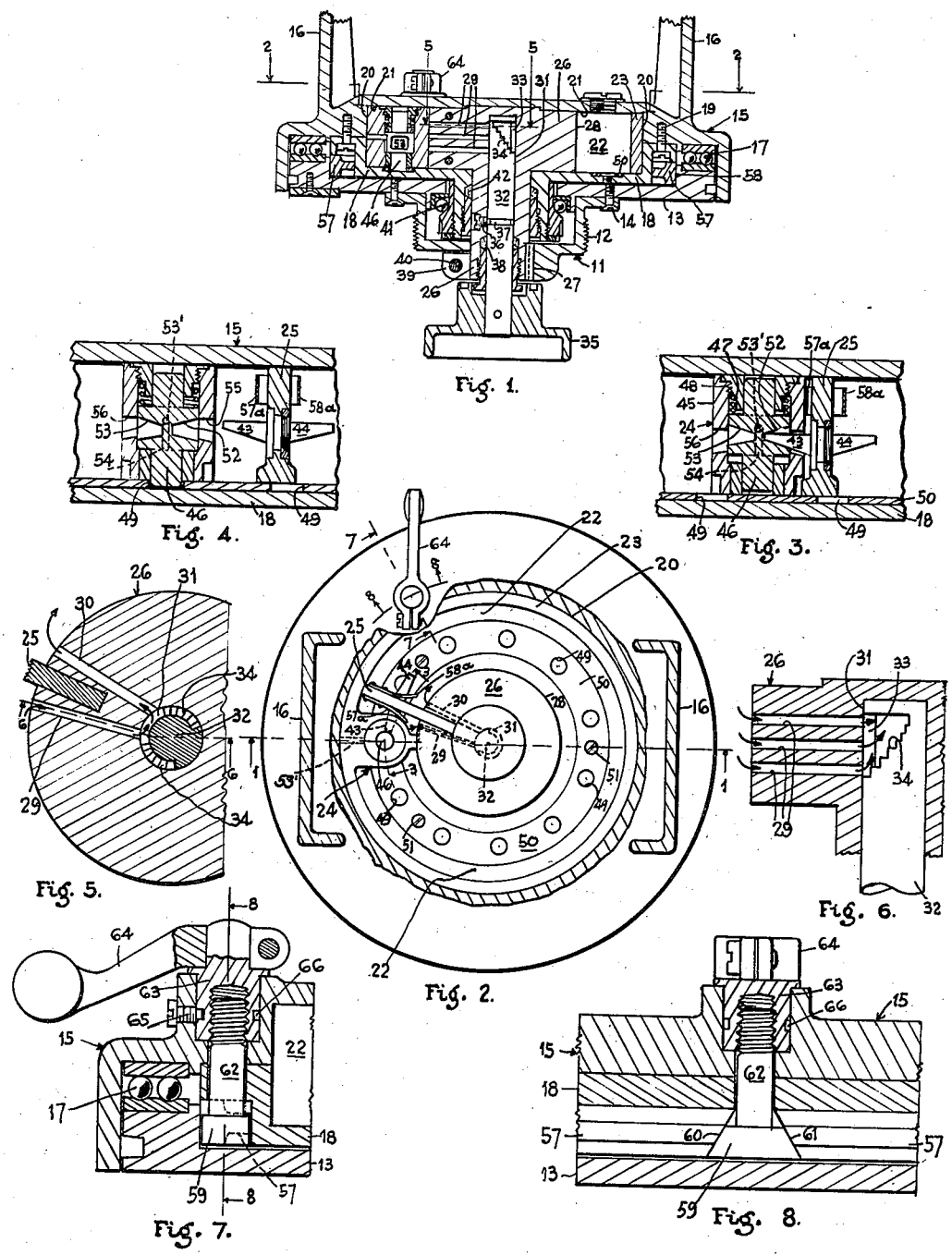
INVENTORS.
Grover Laube
Robert C. Stevens
ATTORNEY.

Patented Feb. 10, 1942

2,272,566

UNITED STATES PATENT OFFICE 2,272,566

CAMERA FREE HEAD

Grover Laube and Robert Colby Stevens, Los Angeles, Calif., assignors to Twentieth Century-Fox Film Corporation, Los Angeles, Calif., a corporation of New York Application March 29, 1939, Serial No. 264,772

9 Claims. (Cl. 248—186)

This invention relates to motion picture equipment and deals with a free-head commonly used in this art for supporting a motion picture camera.

The invention to be described hereinafter refers to our copending application, Serial Number 264,773, filed March 29, 1939, entitled Camera free-head.

In the motion picture art, the camera free-head is used to provide the necessary movements for the camera and ordinarily consists of means for mounting a camera upon a support, such as a tripod or a camera carriage, whereby the camera itself may be swung on both a vertical axis and a horizontal axis. To those versed in this art, these two movements are known as "panning" and "tilting." Panning, in this sense, consists in rotating the camera on the vertical axis and tilting consists in rotating it on the horizontal axis. These two movements may be had separately or simultaneously and when combined provide a mounting for a camera that is acceptable for either a motion picture camera or a still camera. In the conventional free-head now employed, wherein these two movements are obtained, the means for permitting and controlling such movements consists of frictional engagement between two members. In use it has been found that friction has many disadvantages for this purpose. One particular disadvantage occurs at the start of a panning or tilting motion when the sudden start of the slipping action between the two friction plates is apt to set up a series of small intermittent releases, resulting in an uneven motion at the start; another disadvantage resides in the unevenness of friction in swinging the camera over a considerable arc, where the frictional resistance may vary in spots and results in introducing further unevenness or jerky movement in panning or tilting. In motion picture photography it is imperative that the start of either a panning or tilting movement be smooth and the movements throughout must be uniform and without any evidence of even slight interruptions or variations. Also, in panning or tilting, a free-head must be capable of adjustment so as to yield movements varying from fast to slow, all of uniform speed. As stated before, it has been found that friction will not yield these requirements and, as a result, we conceived of eliminating friction as far as possible and utilizing hydraulic pressure resistance to resist turning, with means for controlling the hydraulic resistance with precision. Hydraulic resistance of this nature may be incorporated in a free-head so that either or both a panning or tilting motion of any speed may be obtained without introducing sudden variations in speed either at the start or over a long or a short movement. The present invention deals with the panning movement and the copending application previously mentioned deals with the tilting movement.

In the panning movement there are requirements which are not found in the tilting movement. For instance, in setting up the camera it is necessary that the operator be able to freely swing the camera in both directions to line up the shot. After the camera has been lined up, the operator then determines the amount of swing necessary to take in the pan shot. It is seldom required that he pan up to 360° but he must be able to set up the camera so that he can start his panning movement against resistance from any point determined by the beginning of the pan shot and still allow the required swing to take in the pan shot. In order to accomplish this and use the hydraulic resistance embodied by our invention, it is necessary to provide apparatus that will yield the required arc of swing and at the same time has means for starting the arc of swing from any point. In other words, in order to allow a fully satisfactory panning movement, the apparatus must be so constructed that the operator may mount his camera in any position and may start his panning movement from any position and may continue his panning movement for substantially a full circle against resistance. The means whereby we accomplish this consists of an annular chamber filled with liquid, or any other incompressible substance that will flow under pressure, having a partition therein adapted to stop the flow of liquid around said annular chamber. In combination with said partition, we incorporate a vane adapted to be moved in said annular chamber against the liquid therein by the swinging of the camera and embody a by-pass for the flow of liquid around said vane with means for regulating the resistance to the flow of the liquid to determine the resistance to the panning movement. With such an arrangement it is necessary to provide means for moving the partition relative to the chamber to allow a full swing of the camera in setting up for a shot. Our invention embodies means for automatically transferring the partition from place to place so that the operator may set up his camera, disregarding the position of the partition, and may later adjust the partition to give the amount of swing necessary for the panning movement required.

Briefly stated, the objects of this invention are to provide a camera free-head wherein frictional resistance to panning is reduced to a minimum and the panning movement is made against hydraulic resistance; to provide means for variably regulating the hydraulic resistance to control the speed of the panning movement; to provide a free-head of the above nature which yields the full required panning movement, controlled throughout by hydraulic resistance; to provide a free-head of the above nature having an annular chamber filled with liquid, or a non-compressible fluid substance, and a traveling partition in said annular chamber adapted to be moved from place to place in said annular chamber to provide various initial positions for the beginning of panning movement; and to provide a free-head embodying hydraulic resistance wherein the structure is so arranged and correlated as to provide a carefully designed construction for manufacturing purposes, characterized by sturdiness, durability and workmanlike appearance.

Other objects and advantages will become apparent as the description proceeds in conjunction with the drawing, in which:

Figure 1 is a vertical cross section of part of a camera free-head showing how our invention would be embodied therein to control the panning movement. This view is taken on line 1—1 of Figure 2.

Figure 2 is a view taken on line 2—2 of Figure 1.

Figure 3 is a fragmentary view taken on line 3—3 of Figure 2 and shows the traveling partition whereby the panning movement may be started from any point and swung over any arc desired. In this view the parts are shown in position to move the partition.

Figure 4 is a view similar to Figure 3, but in this view the parts are shown with the partition fixed and the vane movable.

Figure 5 is a view taken on line 5—5 of Figure 1 and shows in an enlarged form the means whereby we are enabled to variably control the hydraulic resistance.

Figure 6 is a vertical sectional view of Figure 5 taken on line 6—6 therein.

Figure 7 is a fragmentary sectional view of the means for locking the panning movement taken on line 7—7 of Figure 2.

Figure 8 is a sectional view of Figure 7 taken on line 8—8 thereof.

Briefly stated, the invention comprises a free-head having incorporated therein an annular chamber adapted to be filled with liquid. In the annular chamber we incorporate a traveling partition with means for adjustably positioning the partition, to be later described. The annular chamber and the partition therein are part of the rotatable super-structure of the free-head and rotate intact with the rotation of the camera. In combination with the rotating annular chamber and the partition, we extend a vane into the annular chamber adapted to bear against the liquid in the chamber, said vane being fixed with respect to rotation and arranged to set up pressure against the liquid when the camera is rotated. In addition to this arrangement, we provide means for by-passing the liquid around the vane so as to permit rotation of the camera and embody means for variably regulating the resistance to flow through the by-pass. Under this arrangement, any rotation of the camera on its vertical axis will cause the annular chamber and the partition therein to rotate and this rotation in turn will force the liquid in the chamber against the fixed vane and, if there is no by-pass around the vane, the resistance to rotation of the camera will amount to an actual stoppage of turning while, on the other hand, if the by-pass is opened, thus permitting liquid to flow around the vane, the camera may be turned against resistance. The passing of the liquid around the vane being controlled by the means, to be hereinafter described, sets up a hydraulic resistance which may be accurately and precisely controlled and which furnishes a smooth uniform resistance to turning throughout the entire arc of the swing of the camera. The means for accomplishing these functions will now be described.

Referring to Figure 1 in particular, it will be seen that we have illustrated a fragmentary cross-sectional view of a camera free-head embodying our invention. Although this view is shown as comprising a great many parts in order to arrive at a practical construction for manufacturing purposes and assembly, nevertheless, the invention embodied therein is comparatively simple. As shown, the free-head comprises in general a base member designated 11, said base member being equipped with screw threads 12, adapted to engage like screw threads upon a tripod, camera support, or a like unit. The member 11, in turn, supports a flanged member 13, which is mounted thereon by means of screws 14. Upon the member 13 there is mounted another member generally designated 15, this member having upright standards 16, fragmentarily shown, for supporting the tilting arrangement disclosed in the aforementioned copending application. Since the tilting arrangement is no part of this invention, no attempt to show any of the parts of this construction is made in the present invention. The member 15 is rotatably mounted upon the member 13 by an annular ball race generally designated 17. As will be seen from the foregoing construction, the member 15 may be freely rotated upon the member 13, which will give the required panning movement to the camera which, as before stated, is supported upon the standards 16. So far, the construction may be considered of more or less standard type. The following construction, however, will deal with the parts embodying our invention. As best shown in Figure 1, a flanged member generally designated 18 is fixed to the member 15 by means of screws 19. It will be noted that the member 15 has formed internally therein a recessed portion bounded by the walls 20 and 21. It will be further observed that the member 18, when joined with the member 15, is so shaped as to meet the wall 20 and form a chamber. By referring to Figure 2, it will be seen that the chamber is circular in shape, but additional parts will be later described showing it to be an annular chamber designated 22. Disposed around the outer circumference of the chamber 22 is a ring 23 adapted to form a sliding fit therein and arranged to be circumferentially moved. Incorporated as an integral part of the ring, or as a separate unit mounted on the ring, is a partition generally designated 24, said partition having incorporated therein means for automatically positioning the partition in various positions around the annular chamber, said means to be later described. The means for forming the annular chamber 22, above mentioned, comprises a member 26 adapted to slidably fit between the wall 21 of the member 15 and the member 18, the outer face of the member 26 forming the wall 28 of the annular chamber 22. As can be seen, the partition 24 would stop any movement of liquid relative to the annular chamber and, since the partition and the chamber are connected with the rotating part of the free-head, it will be evident that upon movement of the camera about the vertical axis the partition will force the liquid to travel with the annular chamber. As a means of setting up resistance to turning of the camera on its vertical axis, we introduce impediment to the movement of liquid with the annular chamber. For this purpose we use a vane generally designated 25 which extends into the annular chamber and is adapted to substantially stop the movement of liquid with the chamber. The vane 25 is mounted upon the member 26, which in turn is held fixed with the member 11 by means of a key 27. It can be seen, therefore, that since the partition 24 rotates with the rotating part of the free-head and the vane 25 is fixed to the stationary part of the free-head, namely, the member 11, that any movement of the camera on the vertical axis will move the partition 24 and consequently force liquid against the vane 25. This would, in effect, provide a stoppage against turning. Accordingly, our invention provides means for by-passing the liquid around the vane and includes a novel means for regulating the amount of flow of liquid around the vane. This obviously results in regulating the resistance to turning of the camera through a hydraulic means. Referring to Figures 2, 5 and 6 particularly, it will be seen that the member 26 is formed with a series of ducts 29 on one side of the vane 25 and a series of ducts 30 on the other side of the vane 25. As shown, these ducts are arranged in substantially vertical relation on each side of the vane and in the present showing there are three on each side. However, the arrangement and number of the ducts are immaterial, except as hereinafter shown. Both series of ducts lead to a common circular chamber 31 which, as shown in Figure 5, provides a free passage of liquid from one side of the vane to the other side, as indicated by the arrows therein. In the chamber 31, which is in reality a drilled hole, we mount a rod 32, said rod being recessed in a series of steps so as to present a successively increasing opening when rotated past the entering ports of the ducts 29 and 30. In other words, referring to Figure 6, it can be seen that the rod 32 is recessed at the upper end, as indicated by the numeral 33, and that the recess ends at stepped points, as indicated by the line 34. Therefore, as the rod 32 is rotated past the duct ports 29, there will in effect be, first, a closing of the lower duct 29, then the middle duct 29, and finally the last and upper duct 29. The number of steps on the recesses may be more or less than shown and may even take a curved line instead of being stepped and still meet the requirements of the invention. The purpose of the foregoing arrangement is to provide a means for regulating the flow of liquid around the vane 25 so that hydraulic resistance may be varied from a complete stoppage to a free flow. As shown in Figure 1, the rod 32 is controlled by a hand knob 35, which extends below the supporting member 11 and is accessible to be manually operated. The rod 32 is held in position in the member 26 by means of a screw 36 working into a recess 37 in the rod 32. In order to insure a leak-proof arrangement, we may incorporate a packing gland 38 between the rod 32 and the member 26.

Also, to provide a tight-fitting engagement between the member 11 and the member 26, we may form the member 11 with a split collar 39 adapted to be clamped by a bolt 40. Interposed between the member 13 and the member 18 is a ball race generally designated 41. The purpose of this race is to hold the rotatable super-structure of the free-head in close relation to the fixed supporting structure and prevent any upward displacement therefrom. In order to further insure a leak-proof fit of all parts, we may incorporate a packing gland arrangement generally designated 42 between the member 26 and the member 18.

As before stated, it is one of the objects of this invention to provide a partition in the annular chamber adapted to be moved therewith in response to movement of the camera. In combination with the partition, the aforementioned vane 25 is adapted to work in such a manner as to obstruct the movement of liquid in the annular chamber. It is obvious that a combination of this nature would work satisfactorily for certain position of the vane and partition; that is, the camera may be turned on the vertical axis up to the point where the vane would encounter the partition. In practice, however, it is necessary that the camera be so mounted that it may be swung a complete revolution, or possibly more, for purposes of setting up the camera and of lining up the camera on the shot, regardless of the position of the partition or vane. Therefore, it is evident that the partition and the vane must be so arranged that either the vane or the partition can be moved to avoid encounter in the annular chamber. Our invention provides means for this purpose. This means is best disclosed in Figures 2, 3 and 4. In Figure 2 it will be seen that the vane 25 has extending tongues 43 and 44, said tongues being similar and on opposite sides of the vane. The construction of the partition 24, as shown in Figures 3 and 4, comprises a casing 45 which, as shown in the illustration, particularly Figure 2, is a part of the ring 23 but which may be a separate unit attached in any convenient manner to the ring 23 if preferred. Inside the casing 45 we mount a plunger 46, said plunger being normally urged downwardly by means of a spring 47, held in place by a screw-threaded member 48. The lower end of the plunger 46 is adapted to engage in holes 49 in a member 50, said member 50 being disposed in the bottom of the annular chamber 22 in such a manner that the rotation of the partition will bring the plunger into registration with the holes 49. The ring 50 is recessed in the bottom of the chamber 22 in order to provide a good leak-proof fit and is held against movement therein by means of screws 51. It can be seen from the foregoing that the ring 23 and the partition 24 may be moved in the chamber 22 to any one of the positions shown by the holes 49, whereupon the plunger 46 will fall into the required hole and the partition 24 will be locked in a new position. The means for automatically moving the ring and the partition consists of the tongues 43 and 44 on the vane 25, which operate in conjunction with tapered holes 52 and 53 in the body of the plunger 46. In Figure 4 we have shown the partition as being locked in position with the plunger 46 in a hole 49. In Figure 3 we have shown the partition in the act of being changed from one hole to another by means of the tongue 43 on the vane 25. In this view it can be seen that the tongue 43 has entered the tapered hole 52 and has forced the plunger upwardly against the urge of the spring 47 until it has cleared the holes 49. This is brought about by rotating the supporting member 15, containing the annular chamber 22 and the partition 24, until the partition traveling with the chamber encounters the fixed vane 25. Then, by continued rotation of the member 15, the tongue 43 will keep the plunger retracted and will force the partition 24 to stand still while the chamber 22 travels past the partition, thus changing the position of the partition in the chamber, with respect to the position of the camera on the supporting member 15. In this manner the partition may be carried over as many holes as required. As soon as rotation of the member 15 is stopped, the pressure between the tongue 43 and the partition 24 ceases and small leaf springs 57a or 58a will force a disengagement of the tongue from the plunger 46, whereupon the plunger will reseat itself in one of the holes 49. If the plunger should happen to fall between two of the holes 49, any movement of the supporting member 15 will cause the liquid to move the partition until the plunger again snaps into a hole and locks the partition in a new position. The operation may be performed from either side of the partition by either the tongue 43 or 44, which naturally will move the partition in opposite directions. As a means of holding the plunger 46 against rotation to insure registration of the tongues with the tapered holes in the plunger, we may provide a pin 53' extending into a slot 54 in the plunger, or we may form a tapered recess completely around the plunger in place of the tapered holes 52 and 53, thus eliminating the pin and slot. Also, the casing is formed with entering holes 55 and 56 which register with the tapered holes 52 and 53 respectively. With the foregoing arrangement, the operator may set up the camera regardless of the position of the partition or of the vane and the partition will be automatically set by the vane to any position desirable or found necessary in order to obtain his full panning movement. This may be done by merely rotating the camera on the vertical axis until the required swing is obtained, whereupon the plunger in the partition snaps into place and the partition is fixed, thus setting the free-head ready for a panning movement. The operation is simple, requiring only that the operator swing the camera to cover the required movement for his pan shot, after which the mechanism automatically sets itself. As before stated, the camera may be swung in either direction and the mechanism works equally as well.

In Figures 7 and 8 we have shown fragmentary views illustrating the mechanism for locking the panning movement. This is accomplished by means of a ring or shoe 57, working against a shoulder 58 on the member 13. By expanding the ring 57, a pressure is exerted outwardly against the shoulder 58 and the super-structure, or the rotatable part of the free-head, is locked in position. The means for expanding the ring comprises a wedge-shaped member 59 arranged to work against two tapered ends 60 and 61 on a split section of the ring 57. The tapered portion 59 is attached to a bolt 62, screw-threaded at its upper end, said bolt being adapted to be screw-threadedly engaged by a turnable member 63 mounted in a socket in the member 15. A thumb nut 64 is suitably attached to the turnable member 63 for turning the same. For purposes of holding the member 63 in position in the member 15, we provide a screw 65, which is adapted to work into a recess 66 in the member 63. This structure is for the purpose of pulling the wedge member 59 up between the tapered ends 60 and 61 of the ring 57 and thereby expand the same to exert a pressure against the wall 58 of the member 13. By this means the panning movement may be securely locked in any position.

The foregoing described parts of the free-head have been dealt with in detail. However, it is obvious that certain detailed part of construction may be altered and modified without in any way changing the function thereof or the principles embodied in the invention. This disclosure is therefore intended to cover all modifications and refinements in construction that may be effected that come within the scope of the disclosure and the purview of the following claims.

We claim:

1. In a camera free-head, a camera supporting member arranged to rotate about a substantially vertical axis, said member having an annular chamber therein adapted to be filled with liquid, said chamber having a series of circumferentially spaced holes therein, a partition in said chamber arranged to stop flow of liquid in said chamber, means for moving said partition to various fixed positions in said chamber, said means including a spring pressed pin in said partition adapted to engage within any one of said holes, a vane fixed to a non-rotatable part of said free-head extending into said chamber and adapted to cause flow of liquid in said chamber upon rotation of said camera supporting member, means on said vane for disengaging said pin from said holes and for moving said partition in said chamber, there being a by-pass arrangement around said vane to permit flow of liquid from one side to the other of said vane upon rotation of said camera supporting member.

2. In a camera free-head, a camera supporting member arranged to rotate about a substantially vertical fixed axial member, said supporting member having an annular chamber therein adapted to be filled with an incompressible fluid, a partition on said supporting member extending into said chamber adapted to stop flow of fluid in said chamber, and a vane fixed on said axial member coacting with said fluid and said partition to set up a hydrostatic pressure against rotation of said camera supporting member.

3. In a camera free-head, a camera supporting member arranged to rotate about a substantially vertical fixed axial member, said supporting member having an annular chamber therein adapted to be filled with liquid, a partition on said supporting member extending into said chamber adapted to stop flow of liquid in said chamber, and means coacting with said liquid and said partition to set up a hydrostatic pressure against rotation of said camera supporting member, said means including a vane fixed to said axial member extending into said chamber, there being a by-pass around said vane for said liquid, and means for regulating resistance to flow of said liquid through said by-pass.

4. In a camera free-head, a rotatable camera supporting member, said member having an annular chamber therein adapted to be filled with liquid, a partition in said chamber arranged to prevent flow of liquid through said chamber, a fixed vane extending into said chamber adapted to exert a liquid pressure on said partition upon rotation of said camera supporting member, and means for moving said partition to various fixed positions to accommodate the position of said fixed vane.

5. In a camera free-head, a rotatable camera supporting member, said member having an annular chamber therein adapted to be filled with liquid, there being a series of holes in said chamber, a partition in said chamber arranged to prevent flow of liquid through said chamber, a fixed vane extending into said chamber adapted to exert a liquid pressure on said partition upon rotation of said camera supporting member, and means for moving said partition to various fixed positions to accommodate the positions of said fixed vane, said last mentioned means including a spring-pressed pin in said partition adapted to engage any one of said holes, and tongues on said vane arranged to engage and lift said pins from said holes, whereupon said partition may be moved to any selected position by continued rotation of said camera supporting member.

6. In a camera free-head, a rotatable camera supporting member, said member having an annular chamber therein adapted to be filled with liquid, there being a series of holes in said chamber, a partition in said chamber arranged to prevent flow of liquid through said chamber, a fixed vane extending into said chamber adapted to exert a liquid pressure on said partition upon rotation of said camera supporting member, and means for moving said partition to various fixed positions to accommodate the positions of said fixed vane, said last mentioned means including a spring-pressed pin in said partition adapted to engage any one of said holes, tongues on said vane arranged to engage and lift said pins from said holes, whereupon said partition may be moved to any selected position by continued rotation of said camera supporting member, and means for disengaging said tongues from said pins upon discontinuance of rotation of said camera supporting member.

7. In a camera free-head, a rotatable hollow camera supporting member, a circular member centrally mounted within said hollow camera supporting member forming an annular chamber therein adapted to be filled with liquid, means for holding said circular member stationary while said camera supporting member is rotated, a partition in said annular chamber adapted to travel with said camera supporting member slidably engaging said circular member, a vane fixed to said stationary circular member extending into the liquid in said annular chamber, means for by-passing liquid from one side to the other of said vane, externally accessible means for regulating resistance to flow of liquid through said by-pass, said last mentioned means including a cylindrical chamber having a plurality of ports, a rotatable shaft in said cylindrical chamber adapted to close all of said ports, said shaft also having a series of varying recesses therein adapted to successively register with said ports upon rotation of said shaft to progressively open or close said ports.

8. In a camera free-head, a camera supporting member arranged to rotate about a fixed axial member, said supporting member having an annular chamber therein adapted to be filled with liquid, a partition in said annular chamber arranged to cause said liquid to move with said chamber, and a vane fixed to said axial member extending into said annular chamber arranged to create a fluid pressure between said vane and said partition resisting rotation of said camera supporting member.

9. In a camera free-head, a camera supporting member arranged to rotate about a fixed axial member, said supporting member having an annular chamber therein adapted to be filled with liquid, a partition in said annular chamber arranged to cause said liquid to move with said chamber, a vane fixed to said axial member extending into said annular chamber arranged to create a fluid pressure between said vane and said partition resisting rotation of said camera supporting member, and means active upon engagement with said partition by said vane for moving said partition to various fixed positions in said annular chamber.

GROVER LAUBE.
ROBERT COLBY STEVENS.